United States Patent [19]

Omura et al.

[11] 4,216,385

[45] Aug. 5, 1980

[54] AC/DC POWER SUPPLY DEVICE

[75] Inventors: Morikazu Omura, Urawa; Akio Kobayashi, Gyota; Yukio Okuda, Fukaya, all of Japan

[73] Assignee: Sawafuji Electric Co., Ltd., Tokyo, Japan

[21] Appl. No.: 955,265

[22] Filed: Oct. 27, 1978

[30] Foreign Application Priority Data

Nov. 10, 1977 [JP] Japan .................................. 52-135081
Feb. 3, 1978 [JP] Japan .................................. 53-11301
Feb. 3, 1978 [JP] Japan .................................. 53-11302
Feb. 3, 1978 [JP] Japan .................................. 53-11303

[51] Int. Cl.$^2$ ............................................. H02J 9/04
[52] U.S. Cl. ...................................... 307/64; 307/151
[58] Field of Search ...................... 307/64, 65, 66, 117, 307/326, 89, 90, 134, 149, 151; 361/1, 437; 363/178, 97, 142

[56] References Cited

U.S. PATENT DOCUMENTS 4,010,381  3/1977  Fickenseher et al. .................. 307/66

Primary Examiner—L. T. Hix
Assistant Examiner—James L. Dwyer

[57] ABSTRACT

An AC/DC power supply device for operating a refrigerator compressor by switching over the AC operation mode in which the compressor is operated from AC power source and the DC operation mode in which the compressor is operated from DC power source through an inverter circuit, wherein a thermostat is constructed so as to be connected to a circuit for supplying DC voltage to the inverter circuit in the DC operation mode, and a switching section is constructed so that high potential points including the potential of the AC power source and low potential points including the potential of the DC power source do not face each other in close vicinity to prevent the AC power voltage from being unwantedly applied to the low voltage side.

27 Claims, 11 Drawing Figures

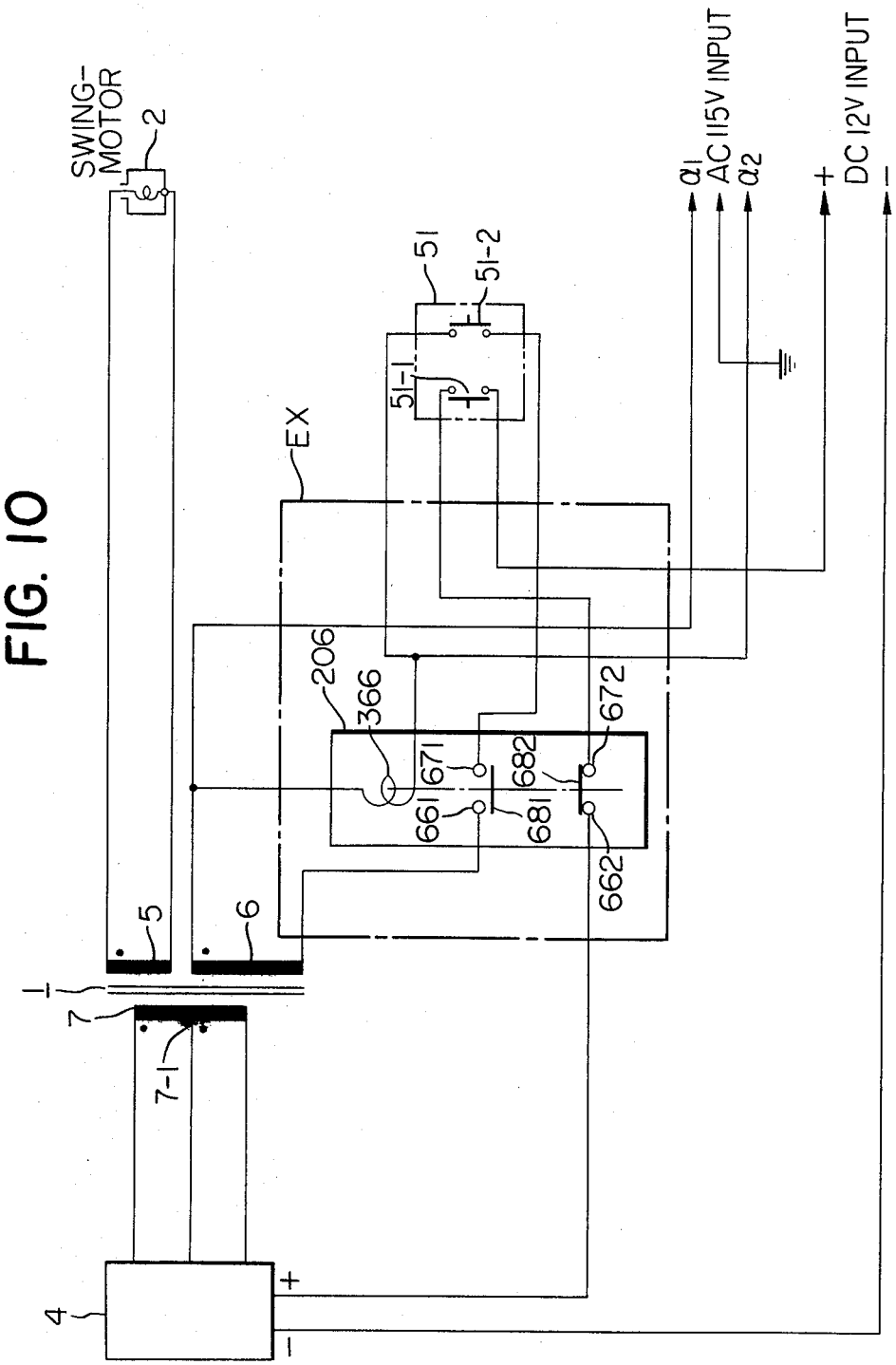

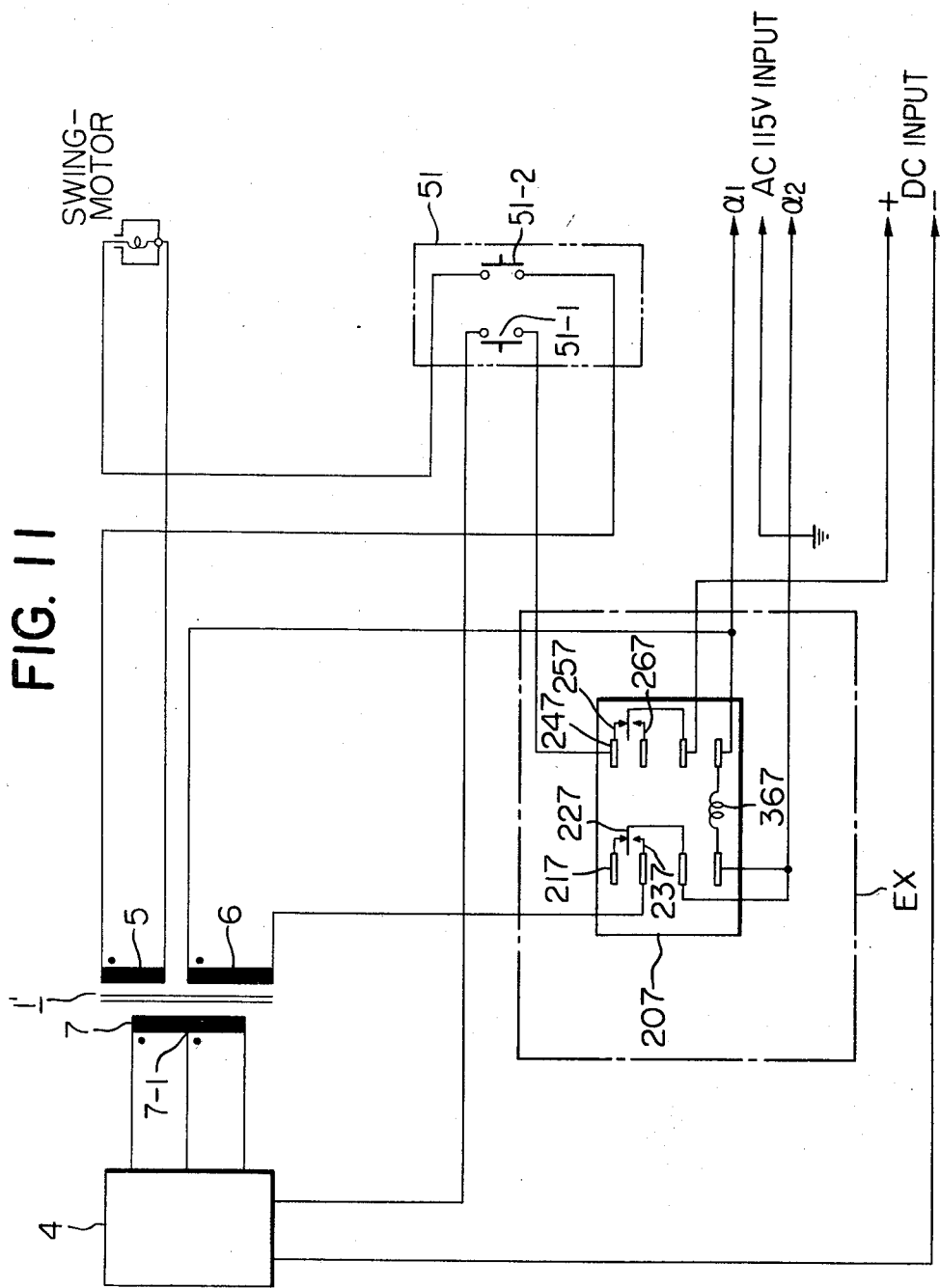

AC/DC POWER SUPPLY DEVICE

BACKGROUND OF THE INVENTION

1. Field of the Invention

This invention relates generally to an AC/DC power supply device, and more specifically to an AC/DC power supply device designed to operate a refrigerator, for example, from either AC power source or DC power source wherein relatively high voltage circuits for AC operation and relatively low voltage circuits for DC operation and/or for AC operation, are adapted not to face each other in close vicinity by simple construction.

2. Description of the Prior Art

Electrical vibration type compressors are generally used in household refrigerators as well as in refrigerators on board automobiles, motor boats, etc. because they are compact in size, light in weight and have good operating efficiency. The electrical vibration type compressor usually has an inverter circuit for converting direct current into alternating current since batteries are used as a power source when it is used in a refrigerator on board an automobile, etc.

To meet such an application, an AC/DC switchable power supply device has been devised as a power supply device which can be operated on either AC power source or DC power source. An example of such a device is shown in FIG. 1.

In FIG. 1, numeral 1 refers to a transformer; 2 to a refrigerator compressor; 3 to a single-contact type thermostat for controlling temperature in the refrigerator to be cooled by the operation of the compressor 2; 4 to an inverter circuit; 5 to an input winding; 6 to an AC input winding; 7 to a winding on the inverter output terminal side; 7-1 to a center tap of the winding 7; 8 to a feedback winding; 9 to a relay for changing over the AC circuit and the DC circuit; 10, 13 and 16 to fixed contacts for DC operation in the relay 9; 11, 14 and 17 to fixed contacts for AC operation in the relay 9; 12, 15 and 18 to movable contacts in the relay 9; 19 to a relay winding in the relay 9; symbol C2 to a smoothing capacitor for smoothing voltage variations in the input fed to the inverter circuit 4, respectively.

When the refrigerator compressor 2 is operated on AC power source, current is supplied to the relay winding 19 of the relay 9 to cause the movable contacts 12, 15 and 18 to electrically connect with the fixed contact for AC operation 11, 14 and 17, respectively. Thus, a circuit from a terminal $\alpha_1$ on the AC power source side to a terminal $\alpha_2$ in the figure via the AC input winding 6, the fixed contact for AC operation 11, the movable contact 12, the single-contact type thermostat 3, the movable contact 15 and the fixed contact for AC operation 14 is formed, and AC power source voltage is fed to the AC input winding 6. This causes an AC low voltage of approximately 24 volts to be generated in the output winding 5 via the transformer 1 to drive the refrigerator compressor 2.

In the meantime, when an AC power source voltage is not applied to the AC input terminals $\alpha_1$ and $\alpha_2$, the compressor 2 is driven on DC power source. In this case, a circuit from a positive terminal of the DC power source to a negative terminal of the DC power source via the fixed contact for DC operation 13, the movable contact 15, the thermostat 3, the movable contact 12, the fixed contact for DC operation 10 and the center tap 7-1 of the inverter output terminal side winding 7 is formed because the fixed contacts for DC operation 10, 13 and 16 in the relay 9 are connected to the movable contacts 12, 15 and 18, respectively, as shown in FIG. 1, and transistors TR1 and TR2 in the inverter circuit 4 alternately repeat on-off operation to feed an AC voltage to the inverter output terminal side winding 7. Thus, an AC voltage is generated in the output winding 5 via the transformer 1 to drive the refrigerator compressor 2.

The feedback winding 8 is for controlling the switching of the transistors TR1 and TR2. The fixed contact for DC operation 16, the fixed contact for AC operation 17 and the movable contact 18 in the relay 9 are for supplying triggering current to the transistors TR1 and TR2 in the inverter circuit 4 when starting the compressor 2 on DC power source.

In the DC operation mode, the single-contact type thermostat 3 is connected to the input side of the DC circuit to prevent losses such as unwanted non-loaded running of the inverter circuit 4 under the state where the single-contact type thermostat 3 remains off, and to prevent damages of transistors, etc. caused by overvoltage generated under the above-mentioned state. The above-mentioned unwanted problems would be occurred if the single-contact type thermostat was installed in the output side.

In this type of AC/DC power supply device, however, when commercial 100-V AC power source is used as an AC power source and a 12-V battery as a DC power source, an AC voltage of approximately 100 V is applied to the fixed contacts for AC operation 11 and 14 and a DC voltage of approximately 12 V is applied to the fixed contacts for DC operation 10 and 13 in the relay 9, and the distance between the fixed contacts for AC operation 11 and 14 and the fixed contacts for DC operation 10 and 13 in the relay 9 is relatively short. Consequently, this type of AC/DC power supply device has inherent dangers of electric shock to human body or damage to other DC devices due to leakage of high voltage to the circuits for DC operation in the low voltage circuits in case withstanding voltage breakdown is caused between the fixed contacts for AC operation 11 and 14 and the fixed contacts for DC operation 10 and 13 during AC operation mode. Furthermore, in the DC operation mode, AC high voltage is induced in the AC input winding 6. And the induced AC high voltage would be leaked to the low potential points.

In addition, this type of AC/DC power supply device has the following drawbacks. As mentioned earlier, an AC power source voltage is fed to the AC input winding 6 during AC operation mode, causing an AC voltage to be generated in the output winding 5 via the transformer 1, and at the same time causing an AC voltage to be generated in the winding 7 on the inverter output terminal side via the transformer 1. This AC voltage generated in the winding 7 on the inverter output terminal side causes the smoothing capacitor C2 to be charged. In this case, the smoothing capacitor C2 repeats charging and discharging. Since the smoothing capacitor C2 serves as an apparent DC power source during discharging, and supplies discharge current to the winding 7 on the inverter output terminal side, bringing the inverter temporarily into an operating state, a voltage is induced in the output winding 5 via the transformer 1. For this reason, the voltage waveform generated in the output winding 5 does not assume a desired waveform, a sine wave, for example. In other words, an unwanted noise is superimposed on the sine wave, for example, resulting in the decreased operating efficiency of the compressor 2 and noise interference to external equipment.

SUMMARY OF THE INVENTION

It is an object of this invention to provide an AC/DC power supply device solving the aforementioned problems, particularly designed for preventing high voltage to leak from the high potential circuits to the low potential circuits.

It is another object of this invention to provide an AC/DC power supply device wherein a thermostat is connected to the drive circuit of the inverter during DC operation mode, and unwanted power consumption of the DC power source due to non-loaded running of the inverter when the thermostat is off, and damage to the transistors, etc. due to overvoltage are prevented.

It is still another object of this invention to provide an AC/DC power supply device which prevents the inverter circuit from unwantedly bringing into the operating state during AC operation mode.

BRIEF DESCRIPTION OF THE DRAWINGS

FIGS. 2 through 11 respectively shows an AC/DC power supply device embodying this invention.

DETAILED DESCRIPTION OF THE EMBODIMENT

Figure 1:
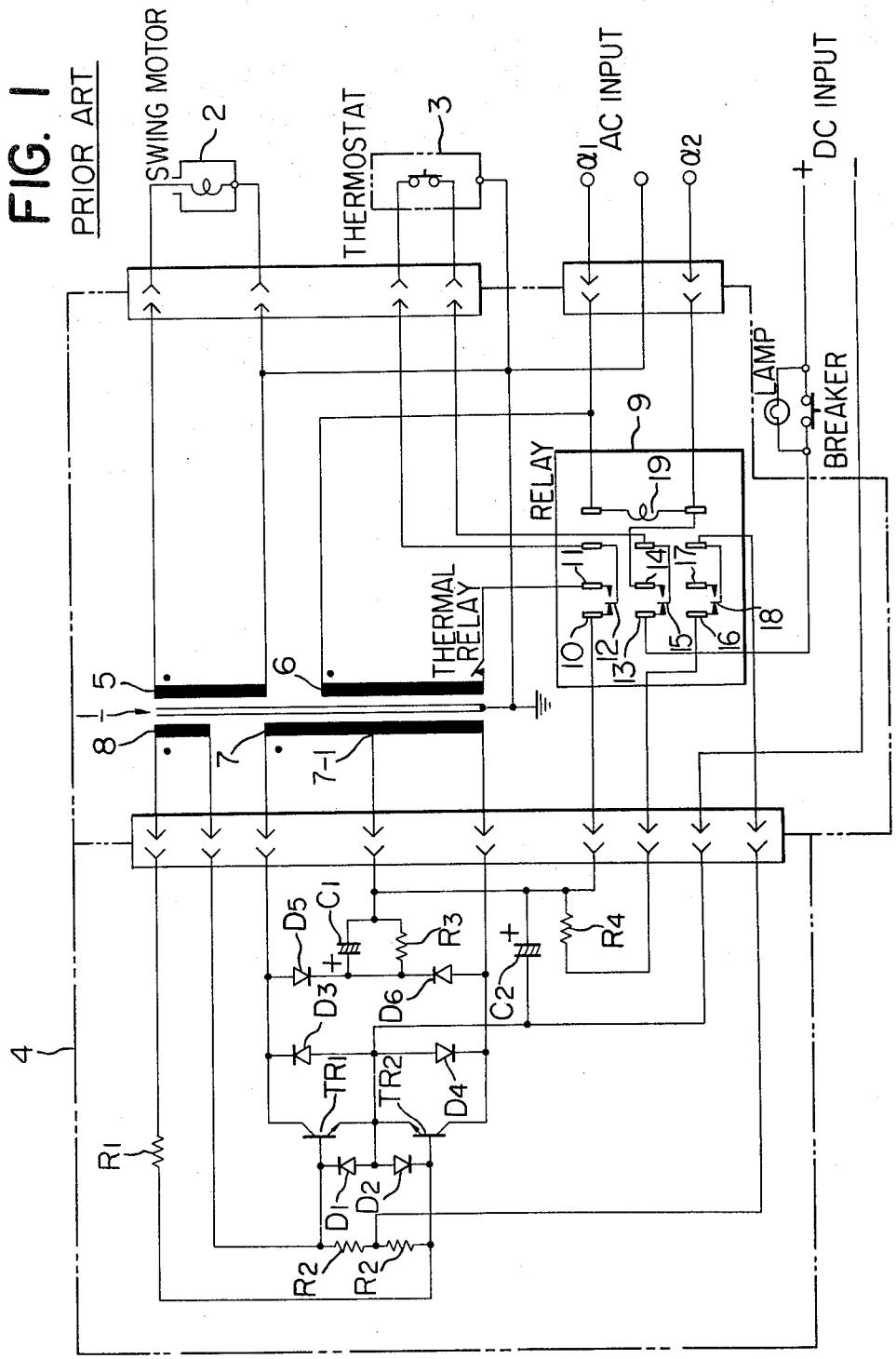
FIG. 1 illustrate an example of the convention type of AC/DC power supply device.
Figure 2:
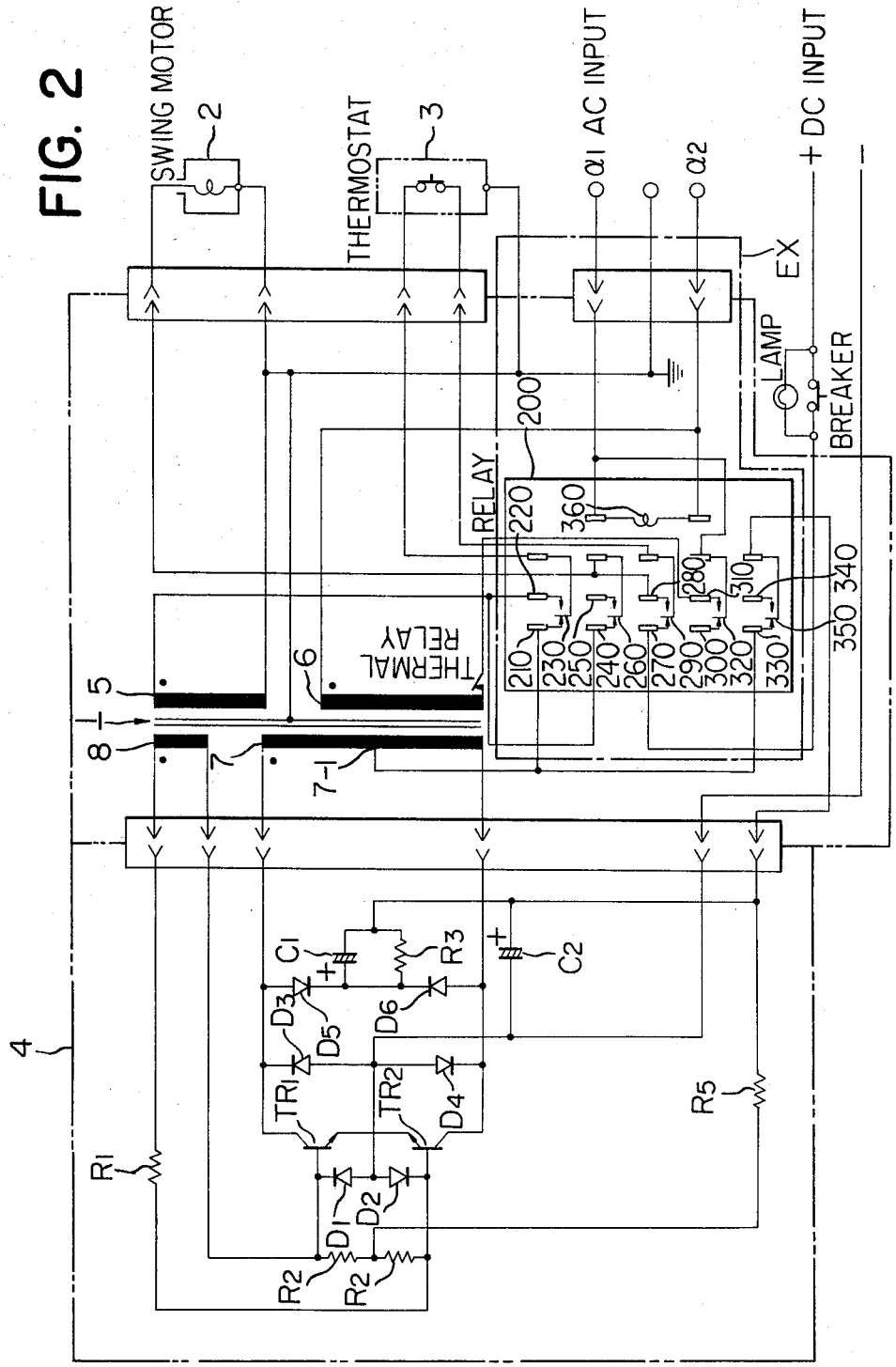

In FIG. 2, symbol EX refers to a switching section; numeral 200 refers to a relay, a part of the switching section EX; 210, 240, 270, 300 and 330 to fixed contacts for DC operation, respectively; 220, 250, 280, 310 and 340 to fixed contacts for AC operation, respectively; 230, 260, 290, 320 and 350 to movable contacts, respectively; 360 to a relay winding, and other numerals and symbols correspond to like numerals and symbols in FIG. 1.

When a refrigerator compressor 2 is operated from AC power source, a current is fed to the relay winding 360 of the relay 200, causing the movable contacts 230, 260, 290, 320 and 350 to be electrically connected to the fixed contacts for AC operation 220, 250, 280, 310 and 340. This completes a circuit from a terminal $\alpha_1$ of the AC power source to a terminal $\alpha_2$ thereof, as shown in the figure, via the movable contact 320, the fixed contact for AC operation 310 and the AC input winding 6, and a closed circuit from the output winding 5 through the fixed contact for AC operation 220, the movable contact 230, the single-contact type thermostat 3, the movable contact 290, the fixed contact for AC operation 280 and the compressor 2 to the output winding 5. Thus, an AC power source voltage is fed to the AC input winding 6, causing an AC voltage to be generated in the output winding 5 via the transformer 1. This AC voltage generated in the output winding 5 drives the compressor 2 while the single-contact type thermostat 3 controls the power supply to the compressor 2.

On the other hand, when the compressor 2 is operated from a relatively low voltage DC power source, a circuit from the positive terminal of the DC power source to the negative terminal thereof via the fixed contact for DC operation 270, the movable contact 290, the single-contact type thermostat 3, the movable contact 230, the fixed contact for DC operation 210, the center tap 7-1 of the winding 7 on the inverter output terminal side and the inverter circuit 4, and a closed circuit from the output winding 5 through the fixed contact for DC operation 240, the movable contact 260 and the compressor 2 to the output winding 5 are formed because the fixed contacts for DC operation 210, 240, 270, 300 and 330 in the relay 200 are normally kept on. In this state, since the fixed contact for DC operation 330 remains on, a triggering current is fed to the transistors TR1 and TR2, causing the transistors TR1 and TR2 to repeat on and off alternately to feed an AC voltage to the inverter output terminal side winding 7. Then, an AC voltage is generated in the output winding 5 via the transformer 1 to drive the refrigerator compressor 2.

In this embodiment, the power supply to the compressor is controlled by controlling the output circuit of the transformer 1 with the single-contact type thermostat 3 in the AC operation mode while the power supply to the inverter circuit 4 is controlled by controlling the DC input side circuits of the transformer 1 with the single-contact type thermostat 3 in the DC operation mode, as mentioned above. Thus, assuming the DC power source voltage is 12 V, a voltage of approximately 12 V is applied to the fixed contacts for DC operation 210 and 270 in the relay 200, and assuming an AC voltage of 24 V is induced in the output winding 5, a voltage of approximately 24 V is applied to the fixed contacts for AC operation 220 and 280. Therefore, the potential difference between both contacts is small enough to eliminate the generation of sparks and arcs between the fixed contacts for AC operation 220 and 280 and the fixed contacts for DC operation 210 and 270 during AC operation mode, thus reducing the dangers of unwanted leakage.

In this embodiment, moreover, an AC voltage is generated in the inverter output terminal side winding 7 during AC operation mode, causing the smoothing capacitor C2 to be charged, but the charged voltage in the smoothing capacitor C2 never serves as an apparent DC power source for the inverter circuit 4 to cause the discharged current to flow in the inverter output terminal side winding 7 because the fixed contact for DC operation 330 and the movable contact 350 are kept in the off state, causing the smoothing capacitor C2 and the center tap 7-1 of the inverter output terminal side winding 7 to be electrically isolated. Consequently, the output voltage waveform generated in the output winding 5 during AC operation mode is based solely on the AC power source voltage fed to the AC input winding 6, thus resulting in the improved operating efficiency of the compressor 2 and elimination of interference noises.

Figure 3:
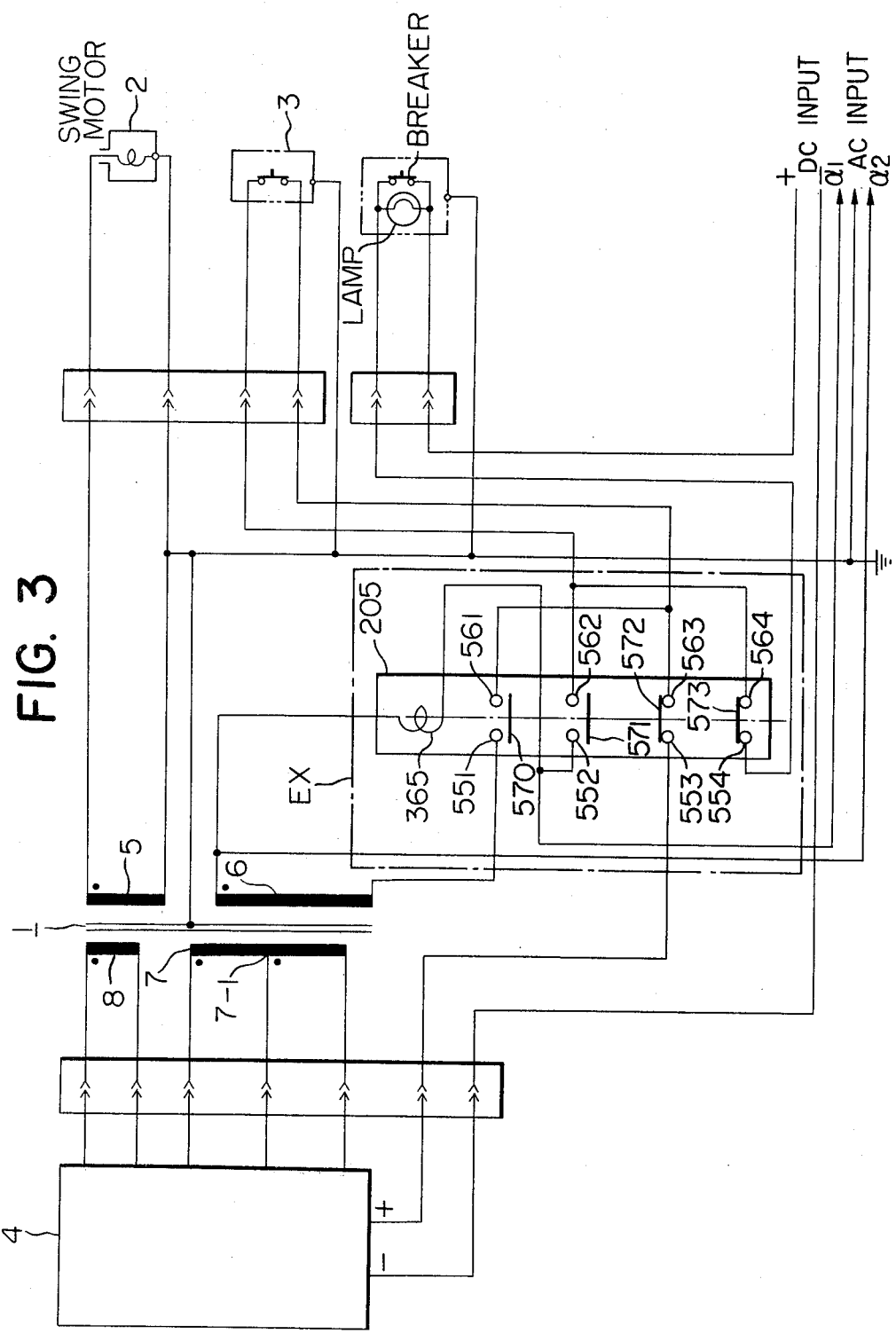

FIG. 3 illustrates another embodiment of this invention where (i) the relay 200 in FIG. 1 is replaced with an electromagnetic switch 205 to increase the withstanding voltage by increasing the contact gap in the electromagnetic switch, and (ii) the single-contact type thermostat 3 is connected to the input side of the transformer 1 during AC operation mode.

In the embodiment shown in FIG. 3, when the refrigerator compressor 2 is operated from AC power source, the drive coil 365 is energized to cause the movable contact 570 to bring the contacts 551 and 561 to the on state, the movable contact 571 to bring the contacts 552 and 562 to the on state, the movable contact 572 to bring the contacts 553 and 563 to the off state, and the movable contact 573 to bring the contacts 554 and 564 to the off state. This completes a closed circuit from the terminal $\alpha_1$ on the AC input side in the figure, through the contacts 552, 571, 562, the single-contact type thermostat 3, the contacts 561, 570, 551 and the AC input winding 6 to the terminal a2. Thus, an AC power source voltage is fed to the AC input winding 6 via the single-contact type thermostat 3, to produce an AC voltage in the output winding 5 to operate the compressor 2.

On the other hand, when the compressor 2 is operated from a relatively low voltage DC power source, the contacts in the electromagnetic switch 205 are either opened or closed, as shown in the figure. Thus, a DC power source voltage is fed from the positive terminal of the DC power source to the inverter circuit 4 via a breaker, the contact 554, the movable contact 573, the contact 564, the single-contact type thermostat 3, the contacts 563, 572 and 553.

In this embodiment, a relatively high AC voltage is applied to the contacts 563 and 564 during the AC operation mode while facing to the contacts 553 and 554, but withstanding voltage breakdown, as described in relation to FIG. 1, never occurs because the withstanding voltage between the contacts of the electromagnetic switch is determined by both the distance between the contacts 563 and 572 and the distance between the contacts 572 and 553, all the contacts being in the off state.

Figure 4:
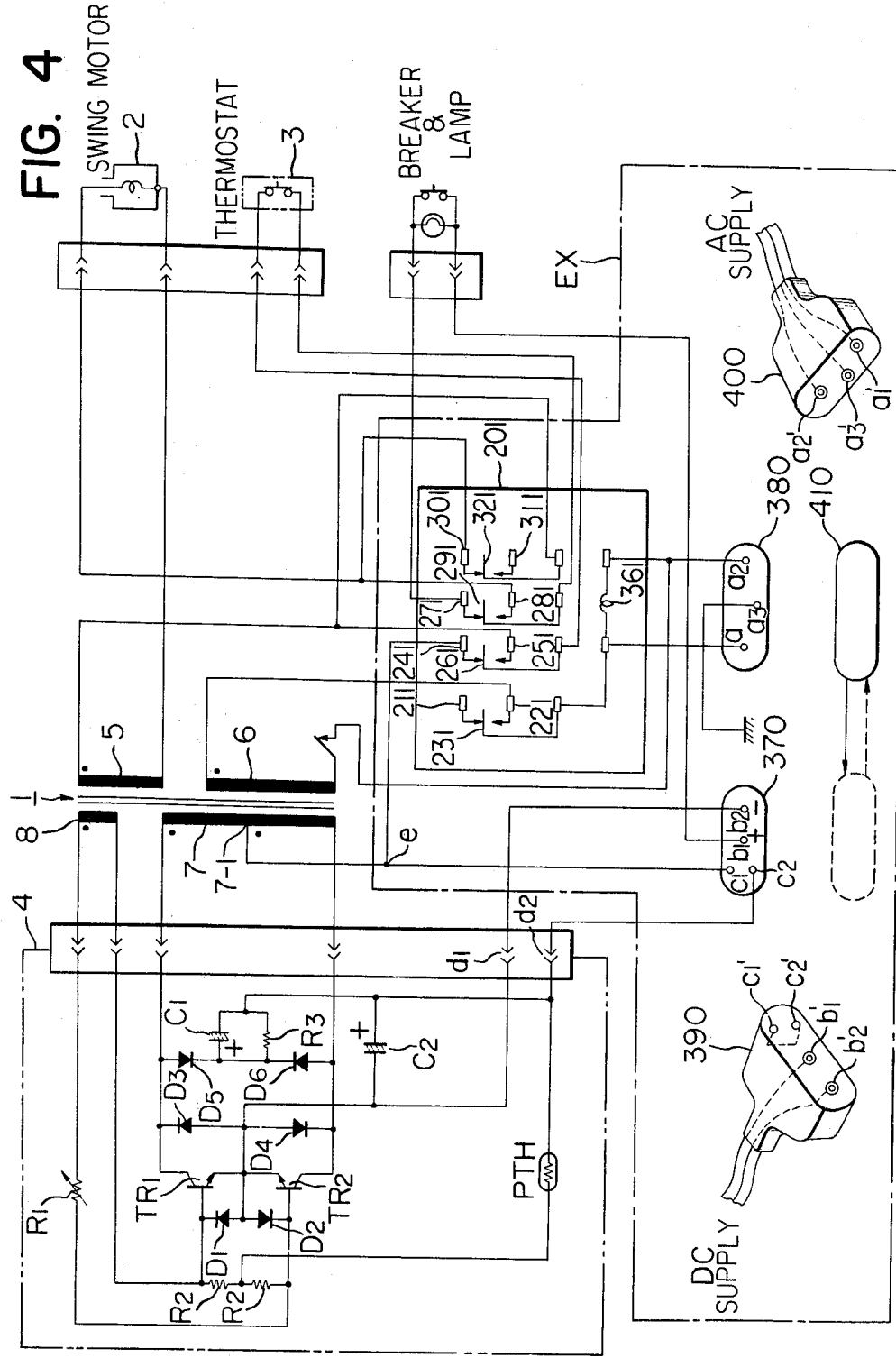

FIG. 4 illustrates still another embodiment of this invention. In the figure, symbol EX refers to a switching section; numeral 201 to a relay which is a part of the switching section, together with a first female connector 370, a second female connector 380, a first male connector 390 and a second male connector 400; 211, 241, 271 and 301 to fixed contacts for DC operation, respectively; 221, 251, 281 and 311 to fixed contacts for AC operation, respectively; 231, 261, 291 and 321 to movable contacts, respectively; 361 to a relay winding; 370 to a first female connector; 380 to a second female connector; 390 to a first male connector which is connected to the DC power source (not shown); 400 to a second male connector which is connected to the AC power source (not shown); 410 to an insulator provided in a position facing to the first and second female connectors 370 and 380; and other symbols and numerals correspond to like symbols and numerals in FIG. 2. The first and second female connectors 370 and 380 are mounted on the device cover so that terminals b1, b2, c1, c2, a1, a2, a3, for example, protrude outward, and the insulator 410 is mounted on the device cover in a position facing to the first and second female connectors 370 and 380 so that the insulator 410 can be moved in either direction as shown by a solid line arrow and a broken line arrow in the figure with respect to the connectors 370 and 380.

In operating the refrigerator compressor 2 from an AC power source, the second male connector 400 is inserted into the second female connector 380 so that the terminals a1, a2 and a3 of the second female connector 380 are electrically connected to the terminals a1′, a2′ and a3′ of the second male connector 400, respectively. This allows current to flow in the relay winding 361 of the relay 201, causing the movable contacts 231, 261, 291 and 321 to be electrically connected to the fixed contacts for AC operation 221, 251, 281 and 311, respectively. This completes a circuit from one terminal of the AC power source to the other terminal via the terminal a1′ of the second male connector 400, the terminal a1 of the second female connector 380, the movable contact 231, the fixed contact for AC operation 221, the AC input winding 6, the terminal a2 of the second female connector 380 and the terminal a2′ of the second male connector 400, and a closed circuit from the output winding 5 through the fixed contact for AC operation 251, the movable contact 261, the single-contact type thermostat 3, the movable contact 291, the fixed contact for AC operation 281 and the refrigerator compressor 2 to the output winding 5. In this state, the insulator 410 is moved to the position shown by broken line to cover the first female connector 370.

On the other hand, when the refrigerator compressor 2 is operated from a DC power source, the first male connector 390 is inserted into the first female connector 370 so that the terminals b1, b2, c1 and c2 of the first female connector 370 are electrically connected to the terminals b1′, b2′, c1′ and c2′ of the first male connector 390, respectively. In the relay 201, the movable contacts 231, 261, 291 and 321 are electrically connected to the fixed contacts for DC operation 211, 241, 271 and 301, respectively. In the DC operation mode, this completes a circuit from the positive terminal of the DC power source through the terminal b1′ of the first male connector 390, the terminal b1 of the first female connector 370, the parallel circuit of the breaker and the lamp, the fixed contact for DC operation 271, the movable contact 291, the single-contact type thermostat 3, the movable contact 261, the fixed contact for DC operation 241, the center tap 7-1 of the inverter output terminal side winding 7, the inverter output terminal side winding 7, the inverter circuit 4, the input terminal d1 of the inverter circuit 4, the terminal b2 of the first female connector 370, the terminal b2′ of the first male connector 390 to the negative terminal of the DC power source. At the same time, a circuit from the output winding 5 through the movable contact 321, the fixed contact for DC operation 301 and the compressor 2 to the output winding 5 is formed. Furthermore, the terminal e connected to the center tap 7-1 of the inverter output terminal side winding 7 and the input terminal d2 of the inverter circuit 4 connected to one end of the smoothing capacitor c2 are shortcircuited by the connection of the terminal c1 of the first female connector 370 and the terminal c1′ of the first male connector 390 and the connection of the terminal c2 of the connector 370 and the terminal c2′ of the connector 390, whereby a starting circuit is formed. This causes the transistors TR1 and TR2 of the inverter circuit 4 to repeat on and off alternately to supply an AC voltage to the inverter output terminal side winding 7. Thus, an AC voltage is generated in the output winding 5 via the transformer 1 to drive the refrigerator compressor 2. The insulator 410 is moved to the position shown by solid line in the figure to cover the second female connector 380, in the DC operation mode.

In this embodiment, too, generation of sparks and arcs from the fixed contacts for AC operation 251 and 281 to the fixed contacts for DC operation 241 and 271 is eliminated during the AC operation mode, eliminating the danger of unwanted leaks, as in the case of the embodiment shown in FIG. 2. At the same time, there is no possibility for the charged voltage of the smoothing capacitor C2 to serve as an apparent power source to the inverter circuit 4 since the smoothing capacitor C2 and the center tap 7-1 of the inverter output terminal side winding 7 are electrically isolated in the AC operation mode.

Since the insulator 410 is constructed so as to cover the first female connector 370 during the AC operation mode and to cover the second female connector 380 during the DC operation mode in this embodiment, accidents caused by electric shocks due to the voltage unwantedly induced between the terminals of the first female connectors 370 and between the terminals of the second female connector 380 can be prevented during the AC and DC operation modes.

Figure 5:
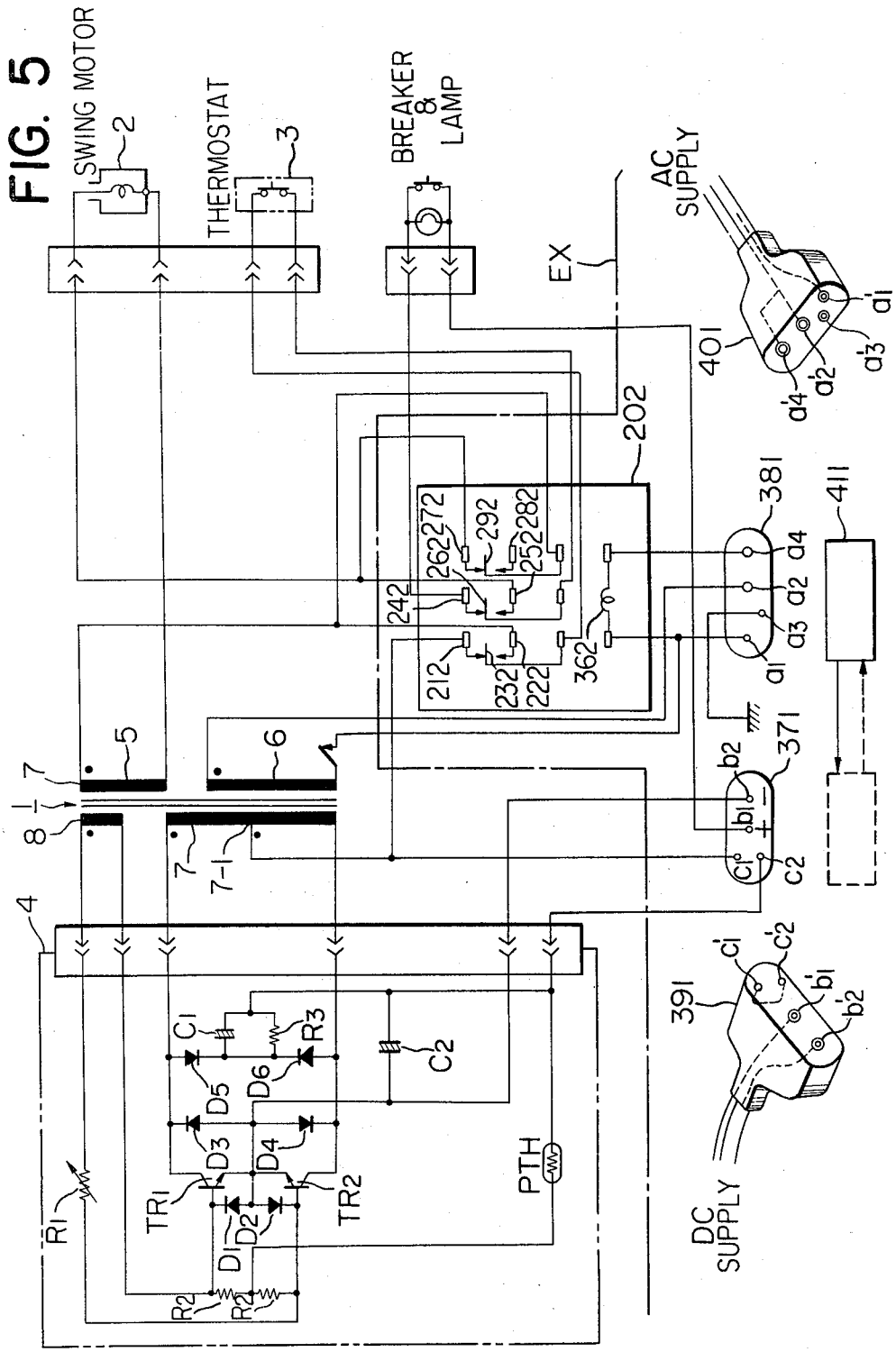

FIG. 5 shows another embodiment of this invention. In the figure, numeral 202 refers to a relay; 212, 242 and 272 to fixed contacts for DC operation, respectively; 222, 252 and 282 to fixed contacts for AC operation, respectively; 232, 262 and 292 to movable contacts, respectively; 362 to a relay winding; 371 to a first female connector; 381 to a second female connector; 391 to a first male connector; 401 to a second male connector; 411 to an insulator provided facing to the first and second female connectors 371 and 381; and other symbols and numerals correspond to like symbols and numerals in FIG. 4.

Figure 6:
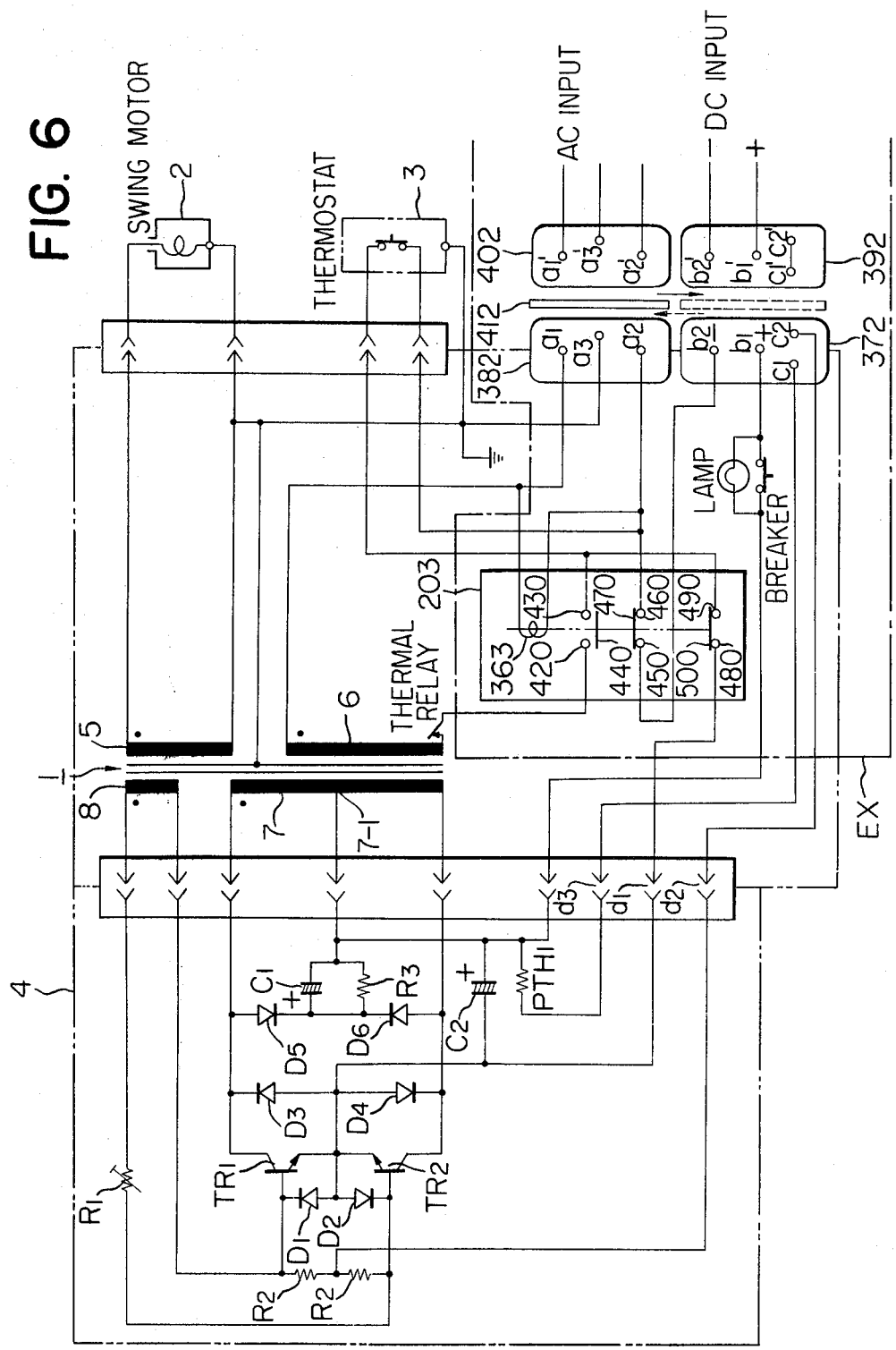
Figure 7:
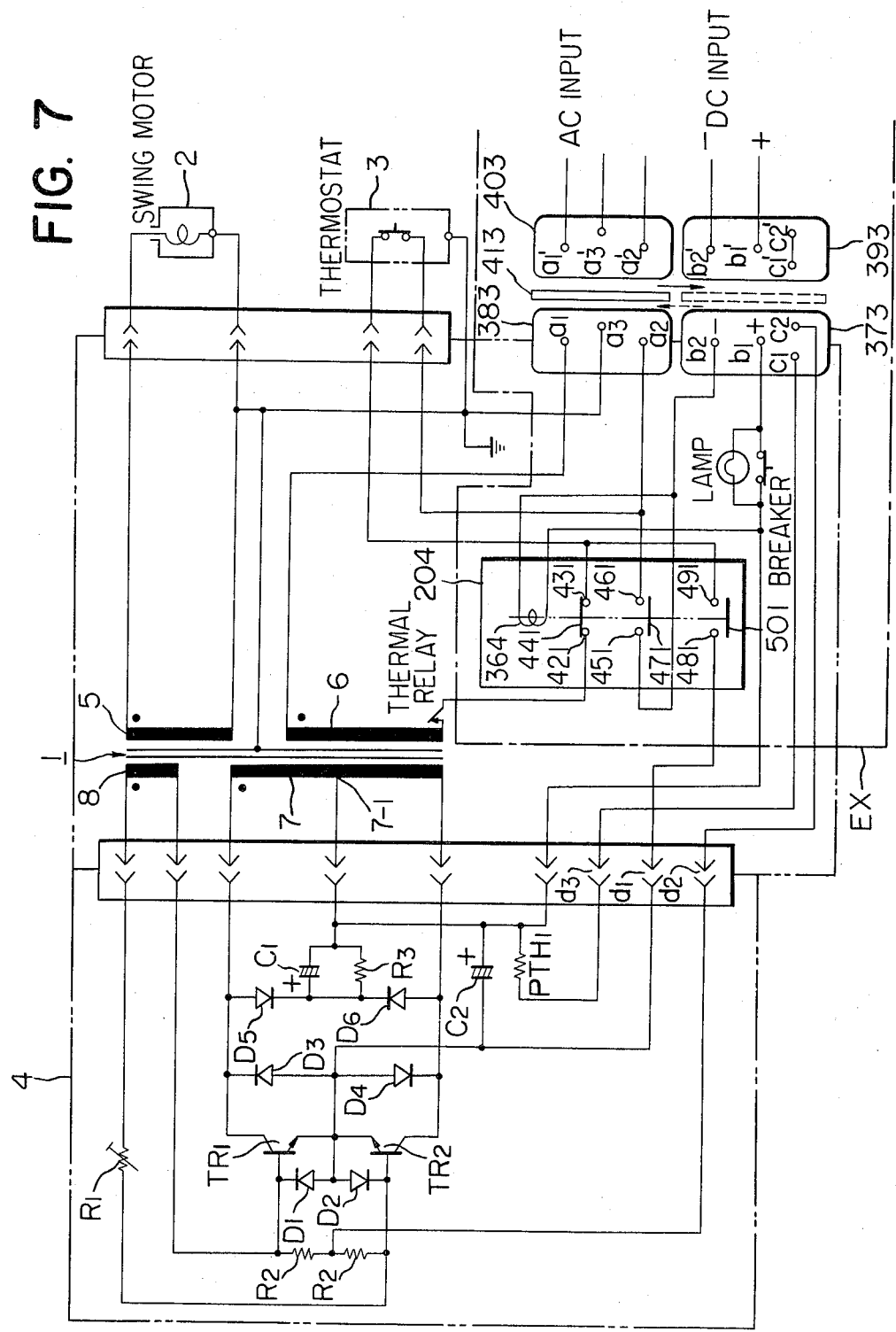

Whereas the supply of AC power source voltage to the AC input winding 6 is controlled by the relay 201 in the embodiment shown in FIG. 4, the supply of AC power source voltage is controlled by the connection and disconnection of the terminals a2 and a4 of the second female connector 381 and the terminals a2' and a4' of the second male connector 401 in this embodiment. Thus, the construction of the relay 202 is much more simplified in this embodiment, as compared with the embodiment in FIG. 4. FIGS. 6 and 7 show other embodiments of this invention, respectively. In these embodiments, electromagnetic switches 203 and 204 having a wide contact gap are used.

In FIG. 6, symbol EX refers to a switching section; numeral 203 to an electromagnetic switch, a part of the switching section EX, together with the first and second female connectors 372 and 382 and the first and second male connectors 392 and 402, which will be described later; 420, 430, 450, 460, 480 and 490 to fixed contacts, respectively; 440, 470 and 500 to movable contacts, respectively; 363 to a drive coil; 372 to a first female connector; 382 to a second female connector; 392 to a first male connector; 402 to a second male connector; 412 to an insulator; and other symbols and numerals correspond to like symbols and numerals in FIG. 2.

The first and second female connectors 372 and 382, the first and second male connectors 392 and 402, and the insulator 412 have the same construction as that of the first and second female connectors 370 and 380, the first and second male connectors 390 and 400, and the insulator 410 in FIG. 4.

In operating the refrigerator compressor 2 from AC power source, the second male connector 402 is inserted into the second female connector 382 so that the terminals a1, a2 and a3 of the second female connector 382 are electrically connected to the terminals a1', a2' and a3' of the second male connector 402. This permits a current to flow in the drive coil 363 of the electromagnetic switch 203, causing the movable contact 440 to shortcircuit the fixed contacts 420 and 430, and the movable contacts 470 and 500 to open the contacts 450 and 460 and the contacts 480 and 490. By causing the movable contact 440 to shortcircuit the fixed contacts 420 and 430, a circuit from one terminal of the AC power source through the terminal a1' of the second male connector 402, the terminal a1 of the second female connector 382, the AC input winding 6, the fixed contact 420, the movable contact 440, the fixed contact 430, the single-contact type thermostat 3, the terminal a2 of the second female connector 382 and the terminal a2' of the second male connector 402 to the other terminal of the AC power source is formed. In this state of AC operation mode, the insulator 412 is moved to the position shown by broken line in the figure to cover the first female connector 372.

In operating the refrigerator compressor 2 from DC power source, on the other hand, the first male connector 392 is inserted into the first female connector 372 so that the terminals b1, b2, c1 and c2 of the first female connector 372 are electrically connected to the terminals b1', b2', c1' and c2' of the first male connector 392. In the electromagnetic switch 203, the movable contacts 440, 470 and 500 are in the state shown in FIG. 6. In other words, the movable contact 440 is kept to the off state, and the movable contacts 470 and 500 to the on state. This completes a circuit from the positive terminal of the DC power source through the terminal b1' of the first male connector 392, the terminal b1 of the first female connector 372, the parallel circuit of the breaker and the lamp, the center tap 7-1 of the inverter output terminal side winding 7, the inverter output terminal side winding 7, the inverter circuit 4, the input terminal d1 of the inverter circuit 4, the fixed contact 480, the movable contact 500, the fixed contact 490, the single-contact type thermostat 3, the fixed contact 460, the movable contact 470, the fixed contact 450, the terminal b2 of the first female connector 372 and the terminal b2' of the first male connector 392 to the negative terminal of the DC power source. At the same time, the input terminals d2 and d3 of the inverter circuit 4 are shortcircuited by the connection of the terminal c1 of the first female connector 372 and the terminal c1' of the first male connector 392 and the connection of the terminal c2 of the connector 372 and the terminal c2' of the connector 392, thus forming a starting circuit. This causes the transistors TR1 and TR2 of the inverter circuit 4 to repeat on and off alternately to supply an AC voltage to the inverter output terminal side winding 7. Thus, an AC voltage is produced in the output winding 5 via the transformer 1 to drive the refrigerator compressor 2. In this state of DC operation mode, the insulator 412 is moved to the position shown by solid line in the figure to cover the second female connector 382.

In the embodiment shown in FIG. 7, the drive coil 364 of the electromagnetic switch 204 is connected to the DC side input section whereas the drive coil 363 is connected to the AC side input section in the embodiment shown in FIG. 6. In the case of the embodiment shown in FIG. 6, the electromagnetic switch 203 does not operate (i) in case the supply of AC power source voltage to any one of the terminals a1' and a2' of the second male connector 402 is interrupted for some reason or other although the second male connector 402 is inserted into the second female connector 382, and (ii) in case the AC power source voltage is decreased for some reason or other to a level that cannot operate the electromagnetic switch 203. For this reason, the embodiment shown in FIG. 6 has a disadvantage in that the AC circuit and the DC circuit become common through the contacts 490, 500 and 480 with the consequence that a high AC power source voltage may be applied to the low voltage DC circuit. In the embodiment shown in FIG. 7, the above-mentioned disadvantage is eliminated since the AC circuit is completely isolated from the DC circuit because the electromagnetic switch 204 does not operate even when the second male connector 403 is inserted into the second female connector 383.

Figure 8:
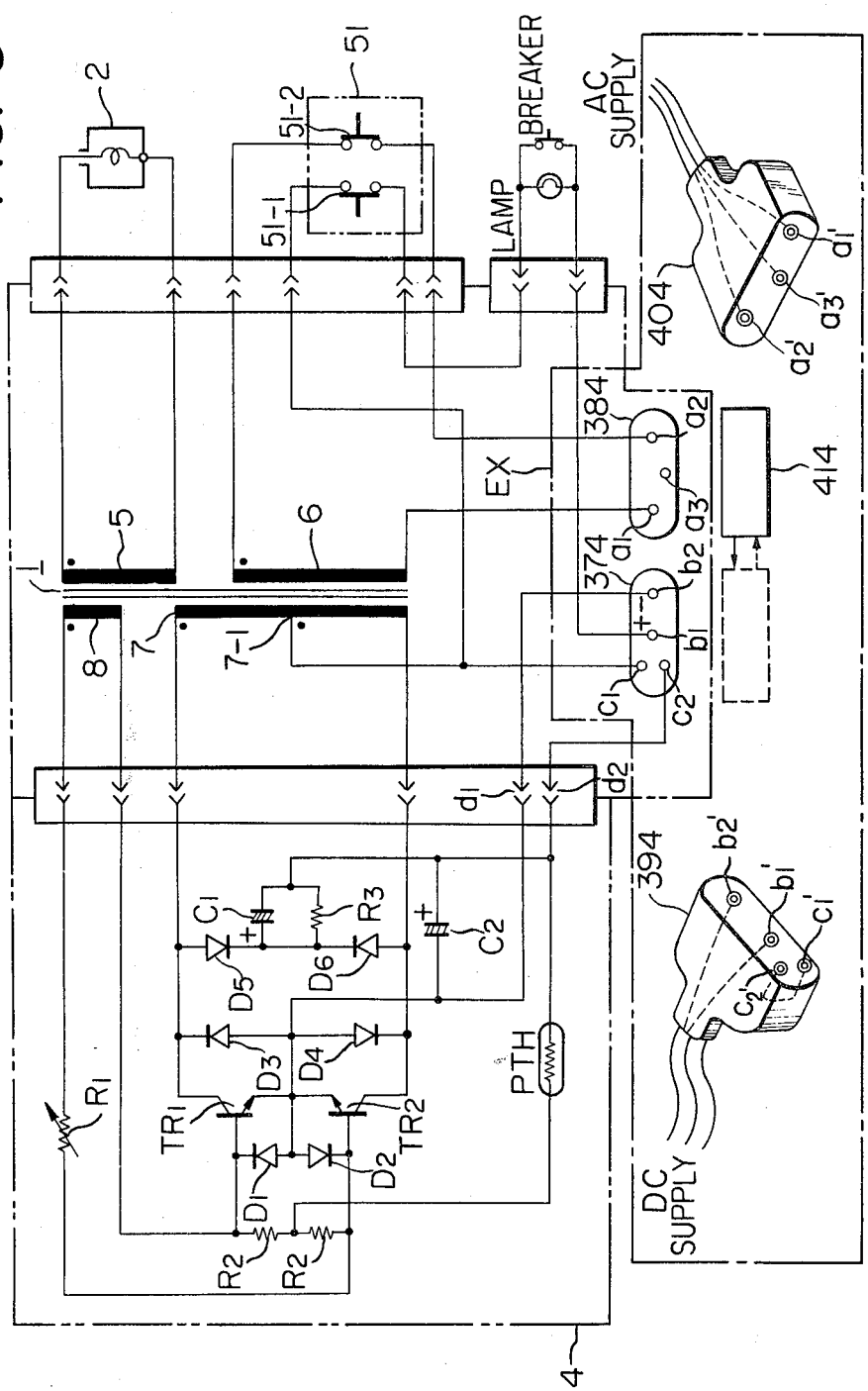

FIG. 8 shows still another embodiment of this invention. In the figure, numeral 374 refers to a first female connector; 384 to a second female connector; 394 to a first male connector; 404 to a second male connector; 414 to an insulator; 51 to a double-contact type thermostat; 51-1 and 51-2 to the contacts of the double-contact type thermostat 51; and other symbols and numerals correspond to like symbols and numerals in FIG. 2.

In operating the refrigerator compressor 2 from AC power source, the second male connector 404 is inserted into the second female connector 384 so that the terminals a1, a2 and a3 of the second female connector 384 are electrically connected to the terminals a1', a2' and a3' of the second male connector 404. This completes a circuit from one terminal of the AC power source through the terminal a1' of the second male connector 404, the terminal a1 of the second female connector 384, the AC input winding 6, the contact 51-2 of the double-contact type thermostat 51, the terminal a2 of the second female connector 384 and the terminal a2' of the second male connector 384 and the terminal a2' of the second male connector 404 to the other terminal of the AC power source to supply an AC power source voltage to the AC input winding 6. Thus, an AC voltage is produced in the output winding 5 via the transformer 1 to drive the refrigerator compressor 2. In this state of AC operation mode, the insulator 414 is moved to the position shown by broken line in the figure to cover the first female connector 374.

In operating the refrigerator compressor 2 from DC power source, the first male connector 394 is inserted into the first female connector 374 so that the terminals b1, b2, c1 and c2 of the first female connector 374 are electrically connected to the terminals b1', b2', c1' and c2' of the first male connector 394. This completes a circuit from the positive terminal of the DC power source through the terminal b1' of the first male connector 394, the terminal b1 of the first female connector 374, the parallel circuit of the lamp and the breaker, the contact 51-1 of the double-contact type thermostat 51, the center tap 7-1 of the inverter output terminal side winding 7, the inverter output terminal side winding 7, the inverter circuit 4, the input terminal d1 of the inverter circuit 4, the terminal b2 of the first female connector 374 and the terminal b2' of the first male connector 394 to the negative terminal of the DC power source. At the same time, the center tap 7-1 and the input terminal d2 of the inverter circuit 4 are shortcircuited by the connection of the terminal c1 of the first female connector 374 and the terminal c1' of the first male connector 394 and the connection of the terminal c2 of the first female connector 374 and the terminal c2' of the first male connector 394, thus forming a starting circuit. This cases the transistors TR1 and TR2 in the inverter circuit 4 to repeat on and off alternately to supply an AC voltage to the inverter output terminal side winding 7. Thus, an AC voltage is generated in the output winding 5 via the transformer 1 to drive the refrigerator compressor 2. In this state of DC operation mode, the insulator 414 is moved to the position shown by solid line in FIG. 8 to cover the second female connector 384.

Figure 9:
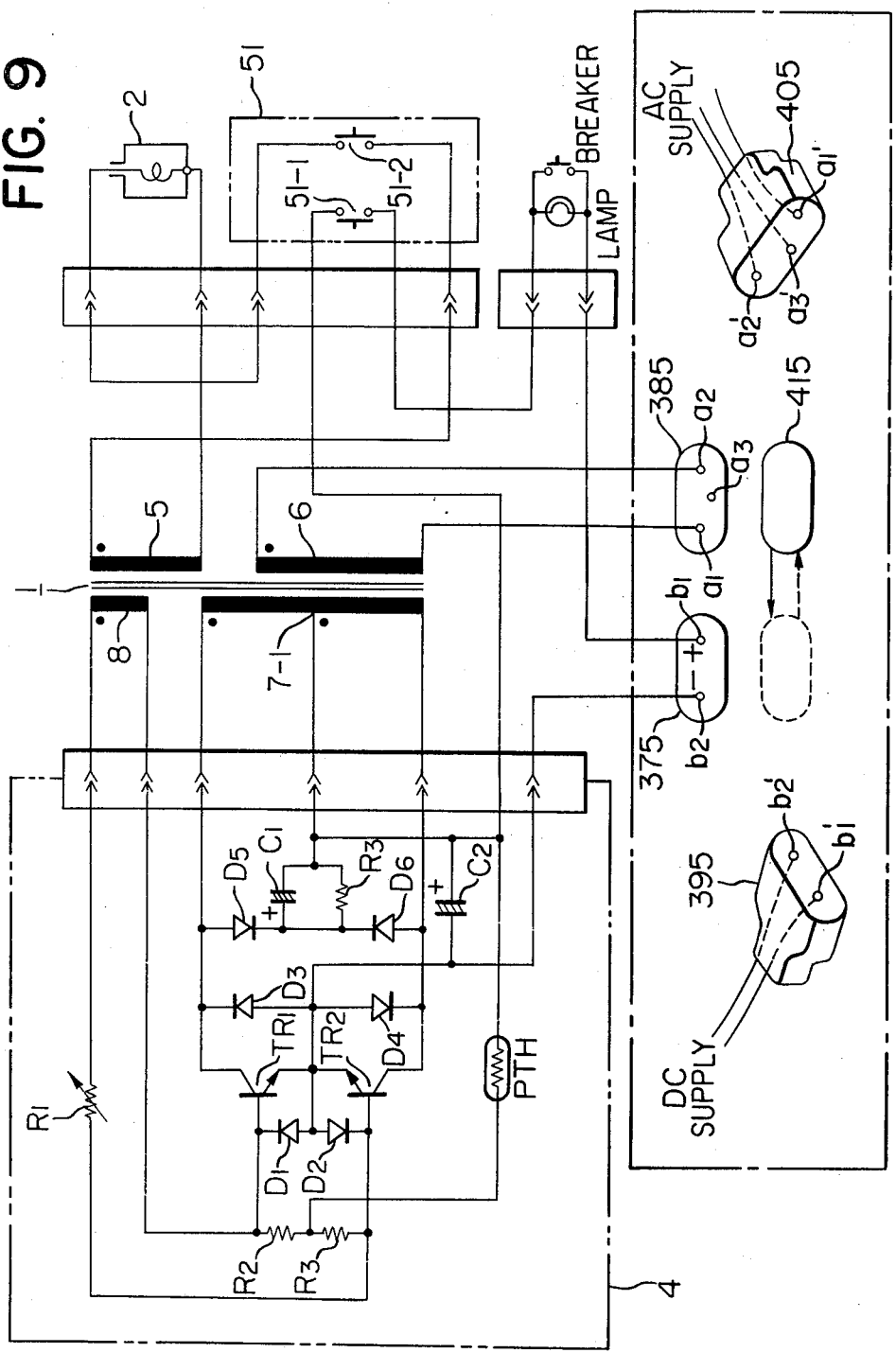

FIG. 9 shows still another embodiment of this invention. In this embodiment, the contact 51-2 of the double-contact type thermostat 51 is connected in series to the output winding 5 in the AC operation mode whereas the contact 51-2 of the double-contact type thermostat 51 is connected in series to the AC input winding 6 in the construction shown in FIG. 8. Moreover, a circuit to disconnect the center tap 7-1 of the inverter output terminal side winding 7 is omitted in the embodiment shown in FIG. 9.

In the AC operation mode, the insulator 415 covers the first female connector 375, and the second male connector 405 is inserted into the second female connector 385 so that the terminals a1, a2 and a3 of the second female connector 385 are electrically connected to the terminals a1', a2' and a3' of the second male connector 405.

In the DC operation mode, on the other hand, the insulator 415 covers the second female connector 385, and the first male connector 395 is inserted into the first female connector 375.

FIG. 10 shows still another embodiment of this invention. This embodiment can be regarded as a case where a double-contact type thermostat, as shown in FIGS. 8 and 9, is used in the construction shown in FIG. 3.

In the embodiment shown in FIG. 10, the drive coil 366 of the electromagnetic switch 206 is energized in the AC operation mode, causing the movable contact 681 to make the contacts 661 and 671 and the movable contact 682 to break the contacts 662 and 672. Consequently, an AC power source voltage is applied to the AC input winding 6 through the circuit from the terminal $\alpha_1$ in the figure of the AC power source, through the AC input winding 6, the contacts 661, 681 and 671, and the contact 51-2 of the double-contact type thermostat 51 to the terminal $\alpha_2$.

In the DC operation mode, the contacts 661 and 671 are kept in the off state and the contacts 662 and 672 to the on state, as shown in the figure. Consequently, a DC power source voltage is applied to the inverter circuit 4 through the circuit from the positive terminal of the DC power source, through the contact 51-1 of the double-contact type thermostat 51, the contacts 672, 682 and 662, and the inverter circuit 4 to the negative terminal of the DC power source.

FIG. 11 shows still another embodiment of this invention. This embodiment can be regarded as a case where (i) a relay 207 is used in place of an electromagnetic switch 206, and (ii) a contact 51-2 of a double-contact type thermostat 51 is connected in series to an output winding 5 in the AC operation mode, in the construction shown in FIG. 10.

In the AC operation mode, the relay winding 367 is energized, making the contacts 227 and 237 and breaking the contacts 247 and 257. Consequently, an AC power source voltage is applied to the AC input winding 6 by the circuit from the AC terminal $\alpha_1$ through the AC input winding 6, the contacts 237 and 227 to the terminal $\alpha_2$. And, the contact 51-2 of the double-contact type thermostat 51 is connected in series to the output winding 5.

In the DC operation mode, on the other hand, the contacts 237 and 227 are kept to the off state and the contacts 247 and 257 to the on state, as shown in the figure. Consequently, a DC power source voltage is applied to the inverter circuit 4 via the double-contact type thermostat 51 through the circuit from the positive terminal of the DC power source, through the contacts 257 and 247, the contact 51-1 of the double-contact type thermostat 51 and the inverter circuit 4 to the negative terminal of the DC power source. At that time, the contact 51-2 of the double-contact type thermostat 51 is left connected in series to the output winding 5. The aforementioned embodiments show that one terminal of AC input winding 6 is opened by the relay or suited in the DC operation mode. But the modification such that the both terminals of AC input winding 6 are opened may be made without departing from the sirit of the invention.

What is claimed is:

1. An AC/DC power supply device for use in a refrigerator drive unit comprising a transformer having at least an AC input winding, an inverter output terminal side winding and an output winding; a refrigerator compressor connected to the output winding and operated by AC power, a thermostat for controlling the temperature of the refrigerator to be cooled by the operation of the refrigerator compressor; an AC power source interchangeably connected to the AC input winding so that an AC power source voltage is applied to the AC input winding; an inverter circuit connected to the inverter output terminal side winding; a DC power source interchangeably connected to the inverter circuit so that a DC power source voltage is applied to the inverter circuit; a switching section for selectively switching over an AC operation mode in which the AC power source is connected to the AC input winding and a DC operation mode in which the DC power source is connected to the inverter circuit, characterized in that the AC/DC power supply device has such a construction that the thermostat turns on and off a DC power source voltage supply circuit to the inverter circuit in the DC operation mode, the inverter circuit has a smoothing capacitor for smoothing the DC power source voltage, and the switching section has a breaking circuit for maintaining the circuit connecting the inverter output terminal side winding and the smoothing capacitor in the off state during the AC operation mode.

2. An AC/DC power supply device set forth in claim 1 wherein the switching section comprises a switching circuit device having an energizing winding which is excited by an applied voltage, the switching circuit device having such a construction that the AC power source voltage is applied to the AC input winding in case only the AC power source voltage is applied and in case both the AC power source voltage and the DC power source voltage are applied.

3. An AC/DC power supply device set forth in claim 2 having such a construction that a single-contact type thermostat is inserted in series in a circuit for supplying a DC power source voltage to the inverter circuit in the DC operation mode switched over by the switching circuit device, and that the single-contact type thermostat is inserted in series in a circuit from the output winding to the refrigerator compressor in the AC operation mode.

4. An AC/DC power supply device set forth in claim 3 wherein the switching circuit device has at least contacts for selectively switching the AC power source and the DC power source, contacts for switching a connecting circuit to the single-contact type thermostat, fixed contacts connected to the output winding and positioned opposite to other fixed contacts connected to the DC power source, and is constructed so as to prevent the energizing winding from being connected to the AC input winding in the DC operation mode.

5. An AC/DC power supply device set forth in claim 2 having such a construction that a single-contact type thermostat is inserted in series in a circuit for supplying a DC power source voltage to the inverter circuit in the DC operation mode switched over by the switching circuit device, and that the single-contact type thermostat is inserted in series in a circuit for supply an AC power source voltage to the AC input winding in the AC operation mode.

6. An AC/DC power supply device set forth in claim 5 wherein the switching circuit device has at least contacts for selectively switching the AC power source and the DC power source, and contacts for switching a connecting circuit to the single-contact type thermostat.

7. An AC/DC power supply device for use in a refrigerator drive unit comprising a transformer having at least an AC input winding, an inverter output terminal side winding and an output winding; a refrigerator compressor connected to the output winding and operated by AC power; a thermostat for controlling the temperature of the refrigerator to be cooled by the operation of the refrigerator compressor; an AC power source interchangeably connected to the AC input winding so that an AC power source voltage is applied to the AC input winding; an inverter circuit connected to the inverter output terminal side winding; a DC power source interchangeably connected to the inverter circuit so that a DC power source voltage is applied to the inverter circuit; a switching section for selectively switching over an AC operation mode in which the AC power source is connected to the AC input winding and a DC operation mode in which the DC power source is connected to the inverter circuit, characterized in that the AC/DC power supply device has such a construction that the thermostat turns on and off a DC power source voltage supply circuit to the inverter circuit in the DC operation mode, and that the switching section comprises a first male connector and a first female connector, both provided between the DC power source and the inverter circuit, and a second male connector and second female connector, both provided between the AC power source and the AC input winding, the first male connector being removably fitted in the first female connector for connecting and disconnecting the DC power source and the inverter output terminal side winding, the second male connector being removably fitted in the second female connector for connecting and disconnecting the AC power source and the AC input winding.

8. An AC/DC power supply device for use in a refrigerator drive unit comprising a transformer having at least an AC input winding, an inverter output terminal side winding and an output winding; a refrigerator compressor connected to the output winding and operated by AC power; a thermostat for controlling the temperature of the refrigerator to be cooled by the operation of the refrigerator compressor; an AC power source interchangeably connected to the AC input winding so that an AC power source voltage is applied to the AC input winding; an inverter circuit connected to the inverter output terminal side winding; a DC power source interchangeably connected to the inverter circuit so that a DC power source voltage is applied to the inverter circuit; a switching section for selectively switching over an AC operation mode in which the AC power source is connected to the AC input winding and a DC operation mode in which the DC power source is connected to the inverter circuit, characterized in that the AC/DC power supply device has such a construction that the thermostat turns on and off a DC power source voltage supply circuit to the inverter circuit in the DC operation mode, in that the switching section comprises a switching circuit device having an energizing winding which is excited by an applied voltage, and in that the thermostat has at least two contacts, and is constructed so that one of the thermostat contacts is used in the DC operation mode and the other thermostat contact is used in the AC operation mode.

9. An AC/DC power supply device set forth in claim 2 or 8 wherein the thermostat has at least two contacts, and is constructed so that one of the thermostat contact is inserted in series in a circuit for supply a DC power source voltage to the inverter circuit in the DC operation mode and the other thermostat contact is inserted in series in a circuit for supplying an AC power source voltage to the AC input winding in the AC operation mode.

10. An AC/DC power supply device set forth in claim 9 wherein the switching circuit device has at least contacts for selectively switching the AC power source and the DC power source.

11. An AC/DC power supply device set forth in claim 2 or 8 wherein the thermostat has at least two contacts and is constructed so that one thermostat contact is inserted in series in a circuit for supplying a DC power source voltage to the inverter circuit in the DC operation mode and the other thermostat contact is inserted in series in a circuit from an output winding to the refrigerator compressor in the AC operation mode as well as in the DC operation mode.

12. An AC/DC power supply device set forth in claim 11 wherein the switching circuit device has at least contacts for selectively switching the AC power source and the DC power source.

13. An AC/DC power supply device set forth in claim 1 wherein the switching section has a first male connector and a first female connector, both provided between the DC power source and the inverter circuit, and a second male connector and second female connector, both provided between the AC power source and the AC input winding, the first male connector being removably fitted in the first female connector for connecting and disconnecting the DC power source and the inverter output terminal side winding, the second male connector being removably fitted in the second female connector for connecting and disconnecting the AC power source and the AC input winding.

14. An AC/DC power supply device set forth in claim 13 or 7 wherein the switching section has the switching circuit device and is constructed so that a single-contact type thermostat is inserted in series in a current for supply a DC power source voltage to the inverter circuit in the DC operation mode and the single-contact type thermostat is inserted in series in a circuit from the output winding to the refrigerator compressor in the AC operation mode.

15. An AC/DC power supply device set forth in claim 14 wherein the switching circuit device has at least contacts for selectively switching the AC power source and the DC power source, contacts for switching a connecting circuit to the single-contact type thermostat, and fixed contacts connected to the output winding and positioned opposite to other fixed contacts connected to the DC power source.

16. An AC/DC power supply device set forth in claim 15 wherein an insulator is provided facing the first female connector and the second female connector, the insulator covering the second female connector in the DC operation mode and covering the first female connector in the AC operation mode.

17. An AC/DC power supply device set forth in claim 14 wherein the switching circuit device has at least contacts for switching the connecting circuit to the single-contact type thermostat, and fixed contacts connected to the output winding and positioned opposite to other fixed contacts connected to the DC power source, and is constructed so that the energizing winding of the switching circuit device is connected to the AC input winding when the second male connector is connected to the second female connector.

18. An AC/DC power supply device set forth in claim 17 wherein an insulator is provided facing the first and second female connectors, the insulator covering the second female connector in the DC operation mode and covering the first female connector in the AC operation mode.

19. An AC/DC power supply device set forth in claim 13 or 8 wherein the switching section has the switching circuit device and is constructed so that a single-contact type thermostat is inserted in series in a circuit for supplying a DC power source voltage to the inverter circuit in the DC operation mode and the single-contact type thermostat is inserted in series in a circuit for supplying an AC power source voltage to the AC input winding in the AC operation mode.

20. An AC/DC power supply device set forth in claim 19 wherein the switching circuit device is constructed so that the energizing winding is excited by the AC power source voltage.

21. An AC/DC power supply device set forth in claim 20 wherein an insulator is provided opposite to the first and second female connectors, the insulator covering the second female connector in the DC operation mode and covering the first female connector in the AC operation mode.

22. An AC/DC power supply device set forth in claim 19 wherein the switching circuit device is constructed so that the energizing winding is excited by the DC power source voltage.

23. An AC/DC power supply device set forth in claim 22 wherein an insulator is provided opposite to the first and second female connectors, the insulator covering the second female connector in the DC operation mode and covering the first female connector in the AC operation mode.

24. An AC/DC power supply device set forth in claim 13 or 8 wherein the thermostat has at least two contacts and is constructed so that one thermostat contact is inserted in series in a circuit for supplying a DC power source voltage to the inverter circuit in the DC operation mode and the other thermostat contact is inserted in series in a circuit for supplying an AC power source voltage to the AC input winding in the AC operation mode.

25. An AC/DC power supply device set forth in claim 24 wherein an insulator is provided opposite to the first and second female connectors, the insulator covering the second female connector in the DC operation mode and covering the first female connector in the AC operational mode.

26. An AC/DC power supply device set forth in claim 13 or 8 wherein the thermostat has at least two contacts and is constructed so that one thermostat contact is inserted in series in a circuit for supplying a DC power source voltage to the inverter circuit in the DC operation mode and the other thermostat contact is inserted in series in a circuit from the output winding to the refrigerator compressor in the AC operation mode as well as in the DC operation mode.

27. An AC/DC power supply device set forth in claim 26 wherein an insulator is provided opposite to the first and second female connectors, the insulator covering the second female connector in the DC operation mode and covering the first female connector in the AC operation mode.

* * * * *

UNITED STATES PATENT AND TRADEMARK OFFICE
CERTIFICATE OF CORRECTION

PATENT NO. : 4,216,385

DATED : August 4, 1980

INVENTOR(S) : Morikazu Omura, Akio Kobayashi, Yukio Okuda

It is certified that error appears in the above—identified patent and that said Letters Patent are hereby corrected as shown below:

Claim 19, line 2: change "8" to --7--.

Claim 24, line 2: change "8" to --7--.

Claim 26, line 2: change "8" to --7--.

Signed and Sealed this

Twentieth Day of January 1981

[SEAL]

Attest:

Attesting Officer

RENE D. TEGTMEYER

Acting Commissioner of Patents and Trademarks